July 31, 1934.  W. OCHSENBEIN  1,968,347

FRANKING, STAMPING, OR THE LIKE MACHINE

Filed Nov. 25, 1932  9 Sheets-Sheet 1

Inventor:-
Walter Ochsenbein
by
Atty.

Fig.1a.

July 31, 1934.  W. OCHSENBEIN  1,968,347
FRANKING, STAMPING, OR THE LIKE MACHINE
Filed Nov. 25, 1932  9 Sheets-Sheet 3

Fig. 2

Inventor:-
Walter Ochsenbein
by [signature]
Atty.

Inventor:-
Walter Ochsenbein
by E. F. Wenderoth Atty.

July 31, 1934.  W. OCHSENBEIN  1,968,347
FRANKING, STAMPING, OR THE LIKE MACHINE
Filed Nov. 25, 1932  9 Sheets-Sheet 5

Inventor:-
Walter Ochsenbein

July 31, 1934.  W. OCHSENBEIN  1,968,347
FRANKING, STAMPING, OR THE LIKE MACHINE
Filed Nov. 25, 1932   9 Sheets-Sheet 6

Inventor:—
Walter Ochsenbein
by E. F. Wenderoth
Atty.

July 31, 1934.  W. OCHSENBEIN  1,968,347
FRANKING, STAMPING, OR THE LIKE MACHINE
Filed Nov. 25, 1932  9 Sheets-Sheet 7

Inventor:—
Walter Ochsenbein
by S. F. Wenderoth
Atty.

Inventor:-
Walter Ochsenbein
by E. F. ———
Atty.

July 31, 1934.  W. OCHSENBEIN  1,968,347
FRANKING, STAMPING, OR THE LIKE MACHINE
Filed Nov. 25, 1932   9 Sheets-Sheet 9

Inventor:-
Walter Ochsenbein
by [signature]
Atty.

Patented July 31, 1934

1,968,347

UNITED STATES PATENT OFFICE 1,968,347

FRANKING, STAMPING OR THE LIKE MACHINE

Walter Ochsenbein, Bern, Switzerland, assignor to Hasler A.-G. vormals Telegraphenwerkstätte von G. Hasler, Bern, Switzerland, a Swiss association Application November 25, 1932, Serial No. 644,350 In Switzerland November 26, 1931

6 Claims. (Cl. 101—91)

This invention relates to a franking, stamping or the like machine of the kind in which several stamping wheels adjustable relatively to one another, such as are used, for instance, for franking letters and postcards, way bills etc., are arranged in a hollow printing cylinder or drum on a common spindle. In such known machines with individually adjustable stamping wheels, the spindle of the stamping wheels is arranged parallel to the printing cylinder axis. It has also been proposed to use the printing cylinder with only one stamping wheel, with several invariable or fixed stamps thereon and with the spindle arranged transversely to the longitudinal axis of the printing cylinder, and to rotate or to set the stamping wheel by means of a toothed rack adjustable in the longitudinal direction by hand, for the purpose of setting one of a fixed number of stamp values. These machines could not be used however for stamping any desired values.

The stamping machine according to the present invention is characterized in that the spindle on which are mounted the several stamping wheels is arranged transversely to the longitudinal axis of the printing cylinder, each stamping wheel being fixed individually to one of a set of gear wheels each of which meshes with one set of teeth of a corresponding toothed rack adapted to travel parallel to the longitudinal axis of the cylinder, another set of teeth on said rack meshing with one of a second set of gear wheels staggered relatively to each other in a direction parallel to the axis of the cylinder, said second set of gears being adapted to operate pin setting devices rotatable on the cylinder surface for setting pin wheels rotatable with the cylinder.

A construction according to the invention is illustrated by way of example in the accompanying drawings in which:—

Figure 7 is a cross-section on line 7—7 of Figure 1a.

Figures 10 and 11 show the proper position of the racks 55 and the type wheels in the starting or inoperative position. The racks 55 have two dentures, with one of which the wheels 55 engage and with the other of which the type wheel, drive wheels 57a engage.

Figure 12:
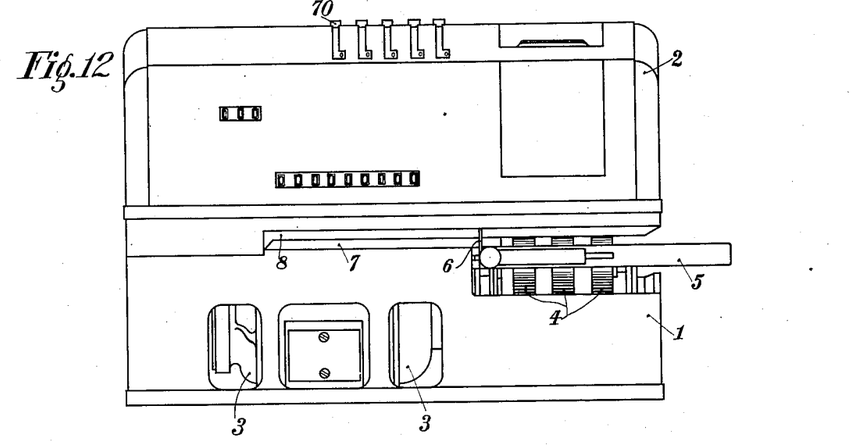
Figure 13:
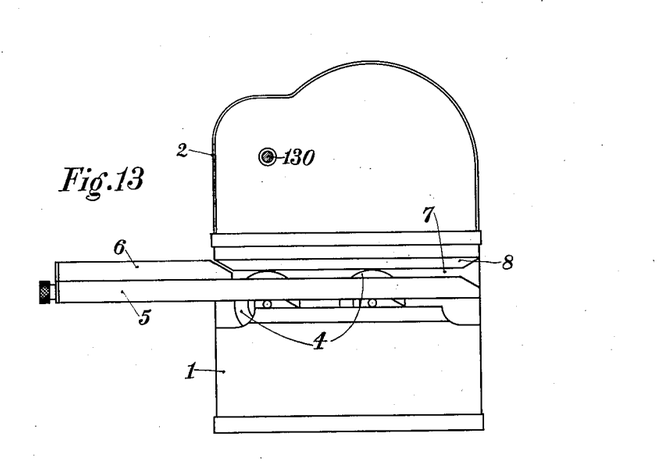
Figures 16, 17:
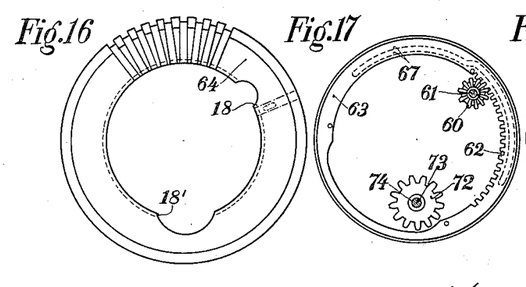
Figure 16 is a front elevation of a transverse (rung) disc wheel.
Figure 17 shows an adjusting ring for the rungs.
Figure 18:
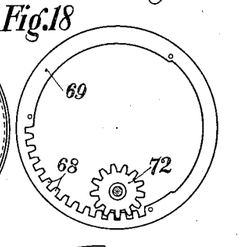
Figure 18 shows a drive ring for the adjusting ring.
Figure 19:
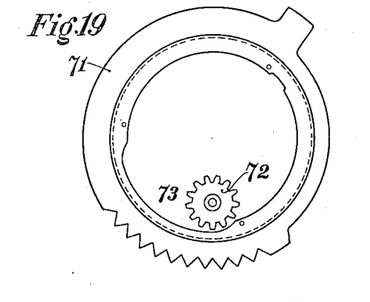
Figure 19 is a manually adjustable ring.
Figure 20:
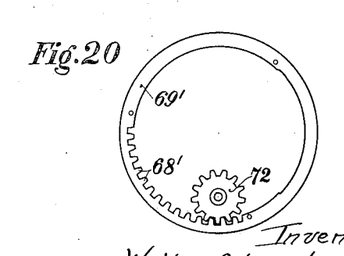
Figure 20 is a coupling ring for setting the printing cylinder in the starting position.

The housing of the stamping machine illustrated which is shown only in Figures 12 and 13, comprises a bottom part 1 and a hood shaped upper part 2. The bottom part 1 carries chiefly the electric driving motor 3 and the driving mechanism (not shown in the drawings) for the conveyor or feed rollers 4 for the letters, postcards etc. to be stamped. 5 is the feeder table by which the articles to be stamped are fed into the machine, and which has a laterally adjustable stop ledge 6. The slot 7 through which the articles pass during stamping is arranged between the two housing parts 1 and 2 and extends through about three quarters of the whole length of the machine, thus enabling envelopes of very large size to be introduced.

Figures 1, 3, 14:
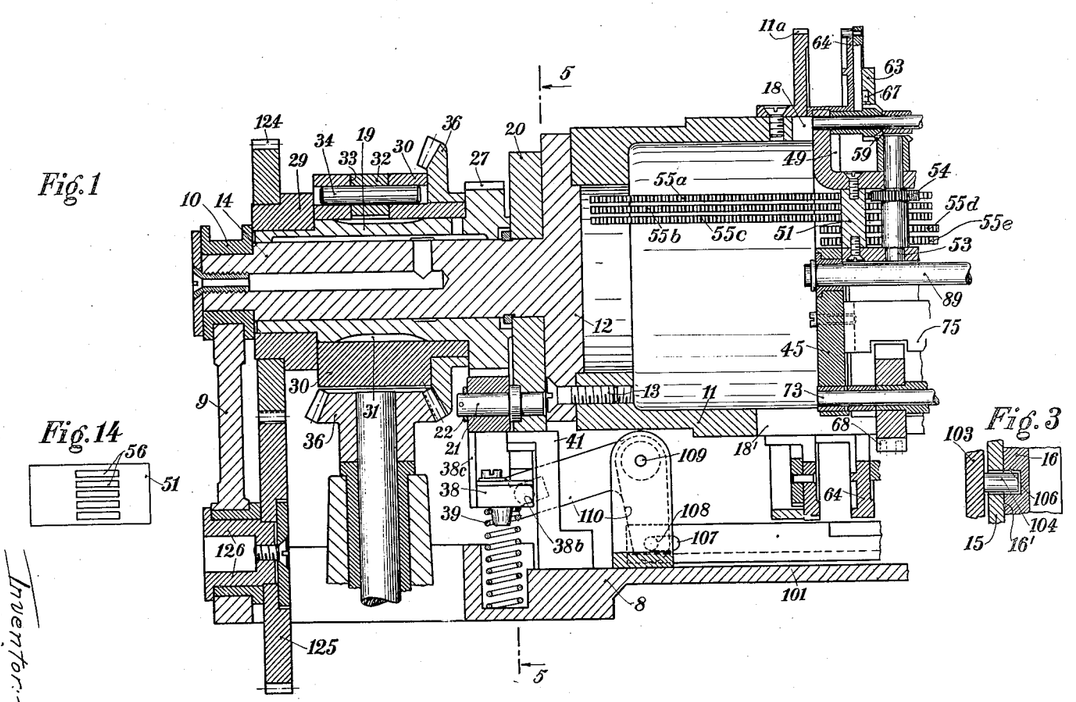
Figure 1 is a longitudinal section of the same.
Figure 3 is a partial section on line 3—3 of Figure 2.
Figures 12 and 13 show a front elevation and a side elevation of the complete machine and Figure 14 is a lateral elevation of a guide member for the transmission racks.

The top part 2 of the housing is provided with a base 8 forming the upper wall of the slot 7. In an end wall 9 (see Figure 1) projecting upwards from the base 8 is mounted, by means of a bearing 10, the journal 14 secured (as shown in Figure 1) to the left hand end of the horizontal hollow printing cylinder 11 by means of a flange 12 and screws 13. The printing cylinder 11 is rotatably mounted near its other end by means of a ring 15 secured thereto, and co-operating with a fixed bearing ring 16, fixed on a member 17 projecting upwards from the base 8. The end part of the printing cylinder 11, to the right of the bearing ring 16, Figure 1, is made of greater diameter than the left hand part, and carries on its outer circumference the printing plates. On the journal 14 is rotatably mounted a sleeve 19, and between this latter and the flange 12 of the journal 14 is rigidly secured a disc 20. A coupling lever 22 (see Figures 5 and 6) is pivoted to the disc 20 by the pivot pin 21, and with its claw 26 engages with a coupling wheel 27 under the action of a spring 25 acting by means of a push pin 23 on a bevelled projection 24 of the lever 22. The toothed coupling wheel 27 is rigidly secured to the right hand end of the sleeve 19 and the push pin 23 is longitudinally adjustable in a head 28 secured to the disc 20. A driver hub 30 is rotatably mounted on the sleeve 19 between a hub ring 29 and the coupling wheel 27.

In order to enable the hub 30 to drive the sleeve 19 in one direction only, the sleeve is provided with ratchet wheel teeth 31 with which a pawl 32 engages, the pawl being mounted on a pin 34 in a recess 33 of the driver hub and held in engagement with the teeth 31 by means of a spring 35. The driver hub 30 carries a bevel wheel 36 which is constantly rotated by the motor 3 mounted in the bottom part 1 of the housing, preferably by means of a worm gear not shown in the drawings, and of a bevel wheel 36a driven by the said worm gear.

Figure 5:
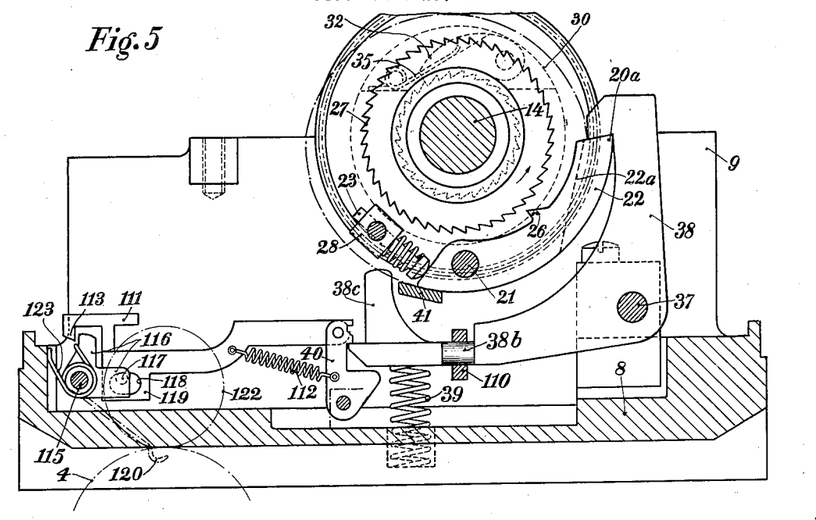
Figures 5 and 6 are sections on line 5—5 of Figure 1 looking to the left and right respectively.
Figure 6:
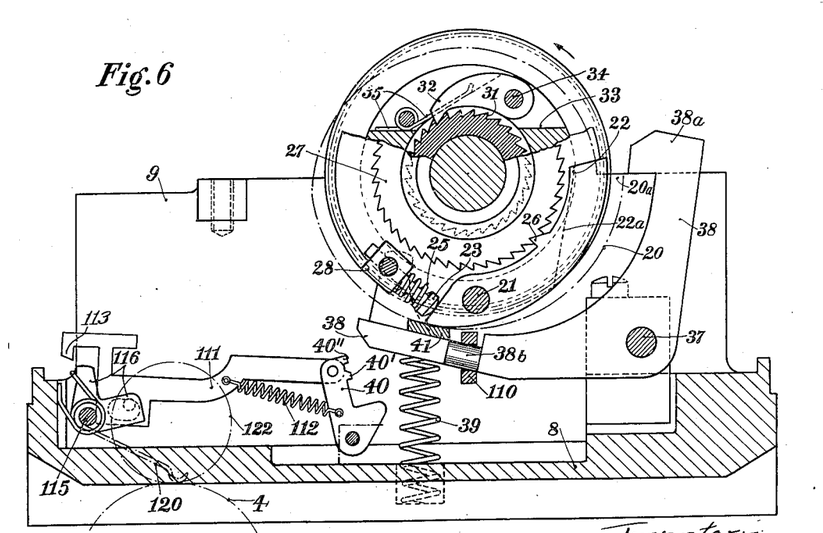
Figure 7:
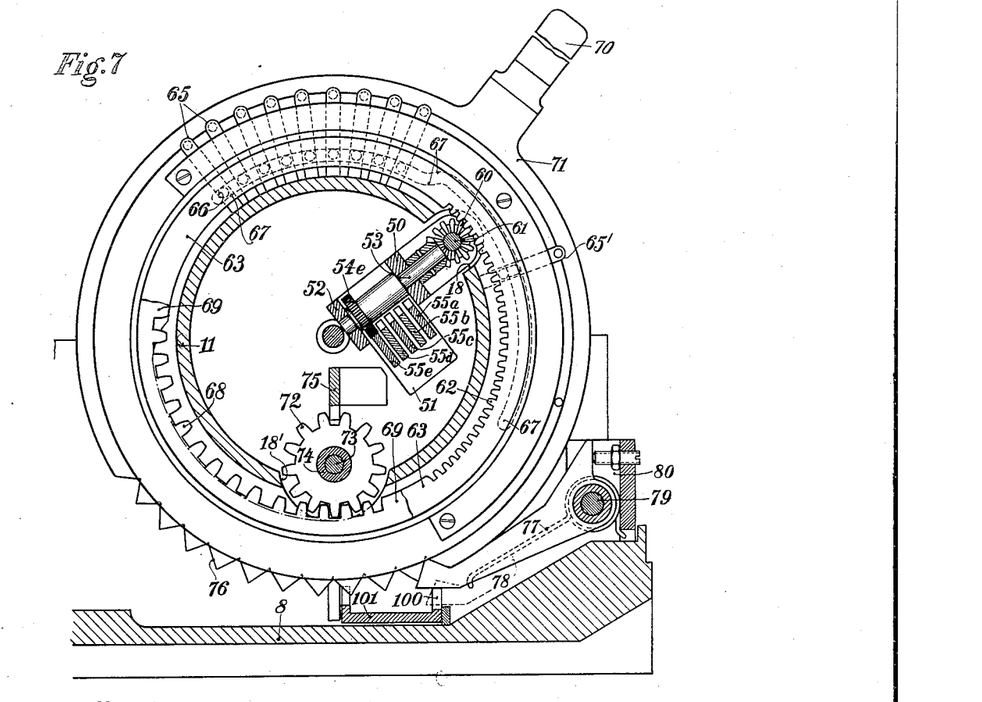
Figures 8, 9:
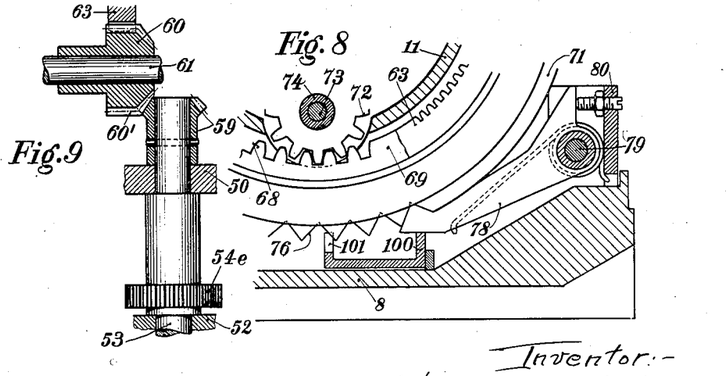
Figure 8 is a partial section similar to Figure 7.
Figure 9 shows on an enlarged scale a pinion for the transmission of the rotation of a pin wheel to a toothed rack for the setting of a stamping wheel.

A projection 38a of a locking bell crank lever 38 pivoted at 37, engages the end of the coupling lever 22 and under the action of a spring 39 on its horizontal arm, on being released by the locking member 40, is moved from the position shown in Figure 5 to the position shown in Figure 6 thereby releasing the coupling lever 29.

The horizontal arm of the locking lever 38 is provided with a reduced cylindrical part 38b and at the end thereof, with a laterally projecting lug 38c bent upwards, which projects within reach of the coupling lever 22. On its longer arm, the coupling lever 22 is provided with a raised surface 22a, Figures 5 and 6, so that when the lug 38c engages therewith during rotation in the direction of the arrow, the coupling lever 22 is moved from the position shown in Figure 6 to that shown in Figure 5.

The movement of the locking lever 38 is limited by an angle stop 41 secured to the base 8. In its operative position (Fig. 5) the locking lever 38 engages by means of its projection 38a, an offset 20a on the disc 20 which is eccentric on the circumference thereof and at the same time thereby prevents the printing cylinder 11 from being turned as long as the locking lever 38 has not been released by the locking member 40. The release device for the locking lever 38 is described hereinafter.

On the inner surface of the part of the printing cylinder 11 of greater diameter is inserted an annular bearing ring 42 which is rigidly secured by screws 43 and has a casing projecting into the part of smaller diameter, having two end walls 44 and 45 arranged at a distance apart.

Figure 1A:
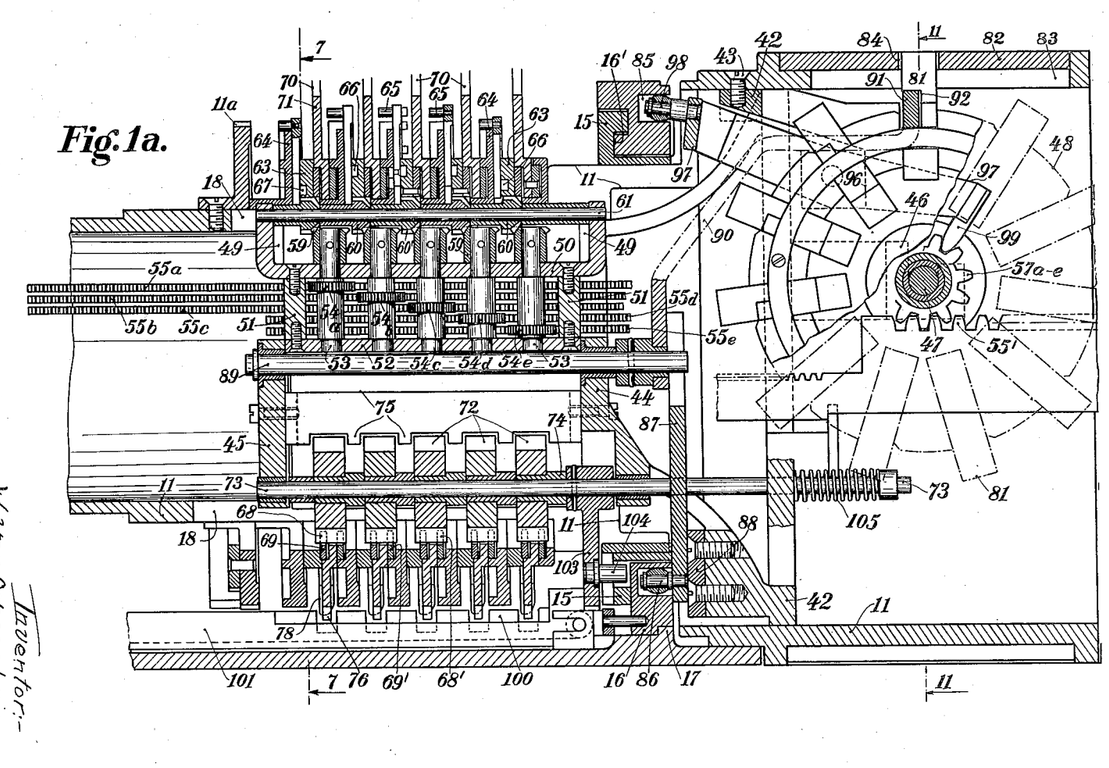
Figure 1a is a continuation of Figure 1 at the right showing a right end portion of the printing cylinder with the type wheels shown as turned 90° relative to the left end portion, so that the type bars 55 and the type wheels are shown in lateral elevation.

In order to explain better the toothed rack gear for setting the stamping wheels 48 arranged in the larger part of the printing cylinder 11, and which are loosely rotatable on a spindle 47 mounted in two arms 46 (see Figure 11) of the bearing 42, transversely of the longitudinal axis of the said cylinder, the part supported by the bearing 42 contained in the larger part of the printing cylinder, is shown turned to about 45° relatively to the upper part of the basket 44, 45 see Figure 1a. In two recesses 49 of the end walls 44 and 45 is mounted a bearing bar 50 bent upwards at its ends and engaging by means of these ends with a longitudinal slot 18 of the cylinder 11, the said bar carrying by means of two webs 51 an inner bearing bar 52.

In the construction illustrated five radial spindles 53 are mounted side by side in the two bearing bars 50 and 52. These spindles 53 carry toothed wheels 54a, or 54b, 54c, 54d, 54e, staggered with respect to each other in the longitudinal direction of the cylinder, each of which engages with a respective toothed rack 55a or 55b, 55c, 55d, 55e. The racks 55 are adjustably guided in slot 56 (Figure 14) in the webs 51 in the longitudinal directions of the printing cylinder. Each of the racks 55 is provided with a second set of teeth 55′ in the larger part of the printing cylinder, by means of which it engages with its respective gear wheel 57a or 57b, 57c, 57d, 57e.

Figure 11:
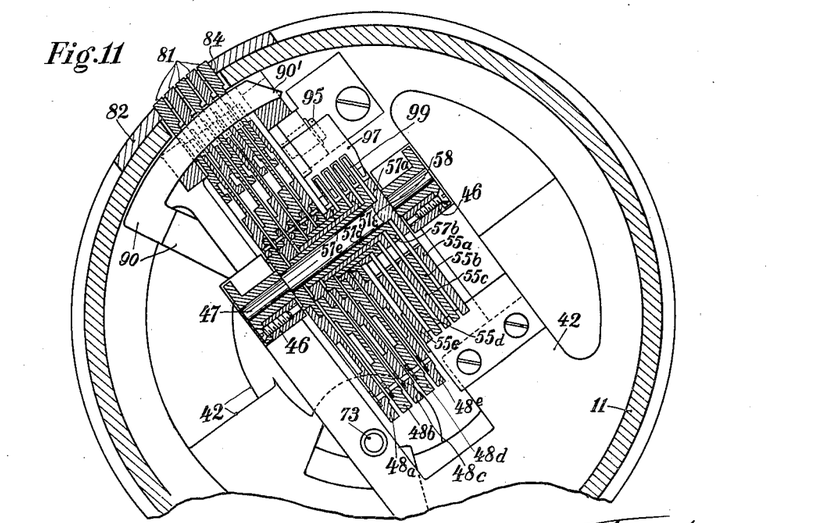
Figure 11 is a section through the stamping wheel in line 11—11 of Figure 1a. These

The gear wheel 57a and the first stamping wheel 48a are rigidly secured to the spindle 47 (see Figure 11). The gear wheel 57b is rigidly secured to the second stamping wheel 48b by means of a hollow spindle 58 loosely rotatable on the spindle 47. The gear wheels 57c, 57d, 57e are rigidly connected in a similar manner to the corresponding stamping wheels 48c, 48d, 48e by means of hollow spindles which are loosely rotatable on the next inner hollow spindle.

On one of the racks 55a–e being moved, the corresponding stamping wheel 48 positively connected to it will therefore be turned in a manner well known in itself through an angle corresponding to the extent of the movement. The movement of the racks 55 is brought about by means of one of the setting devices hereinafter described.

Each of the spindles 53 carries above the bearing bar 50 a bevel wheel 59 (Figures 1 to 9). Each bevel wheel 59 meshes with a corresponding bevel wheel 60, which is loosely rotatable on a common spindle 61 mounted in the ends 49 of the bearing bar 50. Each of the bevel wheels 60 meshes by means of the spur teeth 60′ provided on the circumference, with inner teeth 62 of a ring 63 rotatable on the exterior surface of the cylinder 11.

In Figure 1, a pin wheel 64 is rigidly secured to each ring 63 and each pin wheel 64 is provided with ten pins 65 adjustable in radial slots, for driving a counting mechanism which does not form part of the invention and is not therefore shown in the drawings. Nine of these pins are each provided with a pin 66 laterally projecting from their inner ends, and which engage with a cam groove 67 of the corresponding ring 63. The teeth pin 65′ (Figure 7) which is provided for the carriage of tens digits of the counting mechanism, is loosely adjustable and controlled by the tens carriage mechanism of the counting device.

To each pin setting ring 63 is rigidly secured a driving ring 69 provided with inner teeth 68. Adjacent the driving ring 69, is mounted a ring 71 which can be rotated by hand by means of a setting handle 70, and to which is rigidly secured a second driving ring 69′ with inner teeth 68′

(see Figure 1). The two driving rings 69 and 69' are therefore separated by the thickness of the ring 71.

In order to transmit the rotation of the rings 71 and 69' to the rings 69 and 63 with the printing cylinder remaining still, and thereby to bring a number of pin teeth 65 corresponding to the amount of the rotation into the operative position, a transmission or coupling wheel 72 projecting through a longitudinal slot 18' of the cylinder 11 is provided for each pair of rings 69, 69'. The coupling wheels 72 are mounted in a rotatable manner on a common spindle 73 by means of offset distance sleeves 74, the spindle being mounted in a longitudinally adjustable manner in the two end walls 44 and 45.

When the spindle 73 is moved, all the coupling wheels 72 are also moved axially at the same time, namely in such a manner that they will be in engagement either as indicated in Figure 1 with both rings 69 and 69' of each pair of rings, or only with the ring 69. In the former case, the rings 69 and 69' will be coupled together, in the latter case this connection will be severed.

In the former case the coupling wheel 72 will transmit the rotation of the ring 69' to the ring 69 and therefore to the pin teeth setting ring 63, and in the latter case the printing cylinder 11 will be able to rotate with the rings 69, 63, 64 but without the rings 69' and 71 locked in the manner hereinafter described.

Figure 2:
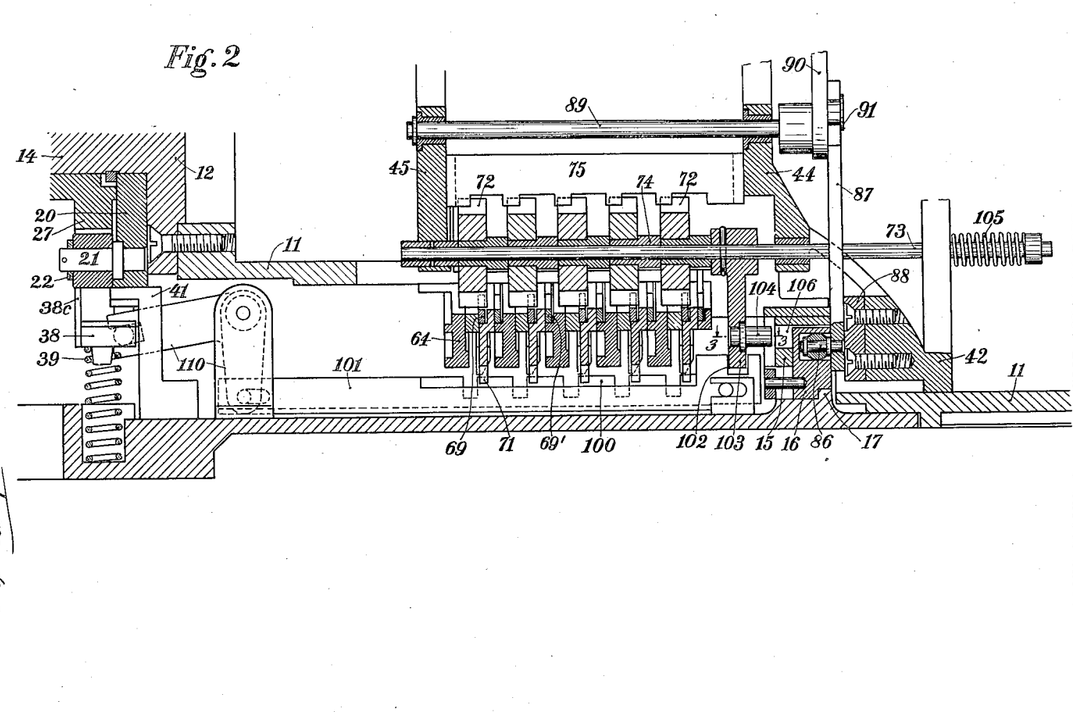
Figure 2 is a partial section similar to Figure 1.

In the position indicated in Figure 1, the coupling wheels 72 are freely rotatable, but in the position indicated in Figure 2 the coupling wheels 72 are prevented from turning relatively to the printing cylinder by means of a locking "rack" 75 arranged between the end walls 44 and 45.

As already stated, in order to prevent the rings 69' and 71 from being driven by friction during the rotation of the printing cylinder, the rings 71 are provided on the bottom part of their circumference with notches 76 with which the pawls 78 engage under the action of springs 77. On the release of the machine, the pawls 78 are automatically locked by means of a device described hereinafter. All the pawls 78 are mounted on a common spindle 79 which is supported in a bearing 80 mounted on the base 8. In addition to the rings hereinbefore mentioned, the printing cylinder is provided with a rim 11a having ratchet teeth, with which a locking pawl (not shown in the drawings) engages and prevents the printing cylinder from rotating backwards.

Each stamping wheel has on the circumference eleven radially adjustable stamps or type carriers 81, ten of which are marked with the numerals 0 to 9 and the eleventh carries in place of a numeral some other character or sign. In their inoperative position the stamps 81 project with their outer ends within an opening 83 of the cylinder 11, closed by a printing plate 82, but do not reach the outer surface of the printing cylinder.

Figure 10:
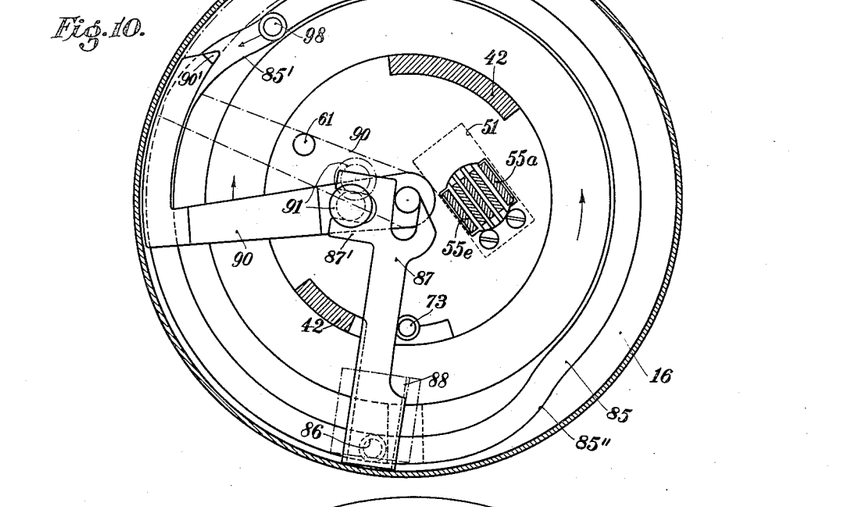
Figure 10 is an inner view of a part of the printing cylinder looking from the right in Figure 1, with the stamping wheel removed.

In order to introduce into the opening 84 of the printing plate 82 the stamps set opposite thereto, and to keep them at the level of the outer face of the printing plate 82, the following setting device is provided common to all the stamps to be simultaneously used for printing. The bearing ring 16 has on the right hand side as shown in Figure 1 a control or cam groove 85 with which engages a pin 86 of a slide 87, said pin being provided with a roller (see Figure 10). The slide 87 is mounted at its outer end in a groove of a member 88 secured to the bearing ring 42 and at its inner end which is formed into a forked head it is mounted in a radially adjustable manner on a spindle 89. The spindle 89 coincides with the longitudinal axis of the printing cylinder, and is mounted on the two end walls 44 and 45 of the bearing ring 42 and has an arm 90 engaging with the slide 87, and projecting towards the side of the stamping wheels 48 up to their axial plane extending transversely of the cylinder. The arm 90 is connected to the slide 87 by a crank pin 91 and by a fork 87' engaging over it and projecting laterally from the slide 87 (see Figure 10) in such a manner that a movement of this slide produces a turning of the arm 90. The free end of the arm 90 is bent towards the stamping wheels 48 and has a bevelled end 90' by means of which, during the rotation in the clockwise direction (see Figure 11) the arm 90 engages with the corresponding recesses 92 of the stamps 81.

In this manner the stamps 81 are pushed outwards into the opening 84 of the printing plate 82 and held therein. When the arm 90 is rotated in the opposite direction, it releases the stamps 81 which are withdrawn from the opening 84 of the printing plate 82 by means of an annular spring which is common to all the stamps of each stamping wheel and is not shown in the drawings.

In order to ensure that the stamps which are to do the printing shall be set correctly before their movement into the opening 84, a lever 97 which engages at one end by means of a sliding roller and pin 98 with the groove or cam 85 is mounted on a pin 98 of an arm 96 projecting to the right (in Figure 1) from the bearing ring 42, and at the other end said lever 97 has five teeth 99 each of which engages with a gap between the teeth of a corresponding toothed wheel 57a–e when they are moved inwards.

The wheels 57a–e are intended therefore both for turning the stamping wheels 48, 81 and for the fine setting of the latter relatively to the printing plate opening 84.

This fine setting of the stamping wheels naturally takes place before the introduction of the stamps into the opening 84, i. e. the two functions are automatically performed successively as soon as the printing cylinder is rotated. The groove 85 has two parts in the form of a circle of different radii (Figure 10) the transition places of which are diametrically opposite to each other, whilst the pins 86 and 98 are displaced relatively to each other in the direction of rotation in such a manner that during the rotation of the printing cylinder in the direction of arrow, the pin 98 is first guided towards the axis by the curve transition 85' and then the pin 86 is guided inwards into the curve transition 85'', that is to say first the stamping wheels are exactly set opposite the opening 84 by the lever 97, and then the stamps to be used for printing are pushed outwards by the slide 87 and the arm 90.

The limiting of the initial or starting position of the printing cylinder, which is normally stopped after each revolution, the disengagement of the coupling wheels 72 and the release of the locking pawls 78 by a locking rack 100 controlling the latter and adjustable on the base 8, take place simultaneously by means of the device hereinafter described.

The locking rack 100 is constituted by one flange of a U-shaped slide 101 resting with its web on the base 8, the other flange of which has a recess or opening 102 as shown at its right hand end in Figure 1, with which an arm 103 secured to the spindle 73 engages from above. The arm 103 (see Figure 3) carries a pin 104 which projects through an opening in the ring 15 and under the action of a spring 105 pulling the spindle 73 to the right, normally engages with the annular surface 16' of the ring 16. The spring 105 causes the pin 104 to enter a recess 106 in the annular surface 16' as soon as it comes opposite the said recess. In this way the printing cylinder is stopped and secured against turning.

At the same time owing to the movement of the spindle 73, the coupling wheels 72 and the slide 101 are moved from the position shown in Figure 2 to the position shown in Figure 1, that is to say the setting rings 71 are unlocked.

A pin 108 of one arm of a bell crank lever 110 pivoted at 109 engages with a longitudinal slot 107 in one flange of the slide 101 and the other arm of the lever 110 is bifurcated and engages over the round neck 38b of the locking lever 38. The force of the spring 39 acting on the locking lever 38 is however greater than that of the spring 105 pulling the spindle 73 to the right, so that the latter spring can only produce a movement of the spindle 73 with the parts coupled to it when the locking lever 38 is held in its locking position (Figure 5). The play of the pin 108 in the slot 107 makes it possible for the lever 38 to be moved by the coupling lever 22 from its position of rest (Figure 6) into its working position, without pushing the slide 101 to the right. As long as the pin 104 has not reached the recess 106 of the fixed bearing ring 16, the latter prevents a movement of the slide 101 to the right, and therefore the setting rings 71 and of the stamping wheels cannot be made until the printing cylinder has reached its starting or locking position.

The release of the machine or the disengagement of the locking lever from its working position (Figure 5) is performed by the device hereinafter described. To the locking member 40 is pivoted a hook 111 which is drawn down by a spring 112. The hook 111 engages with its downwardly bent end over an arm of a bell crank lever 116 secured to a horizontal spindle 115, said arm projecting upwards and provided with a release nose 113, the other arm of the said bell crank lever being provided with a pin 117 which engages with a slot 118 in a lug 119 of the hook 111, the pin 117 being allowed some play in the slot 118.

Figure 4:
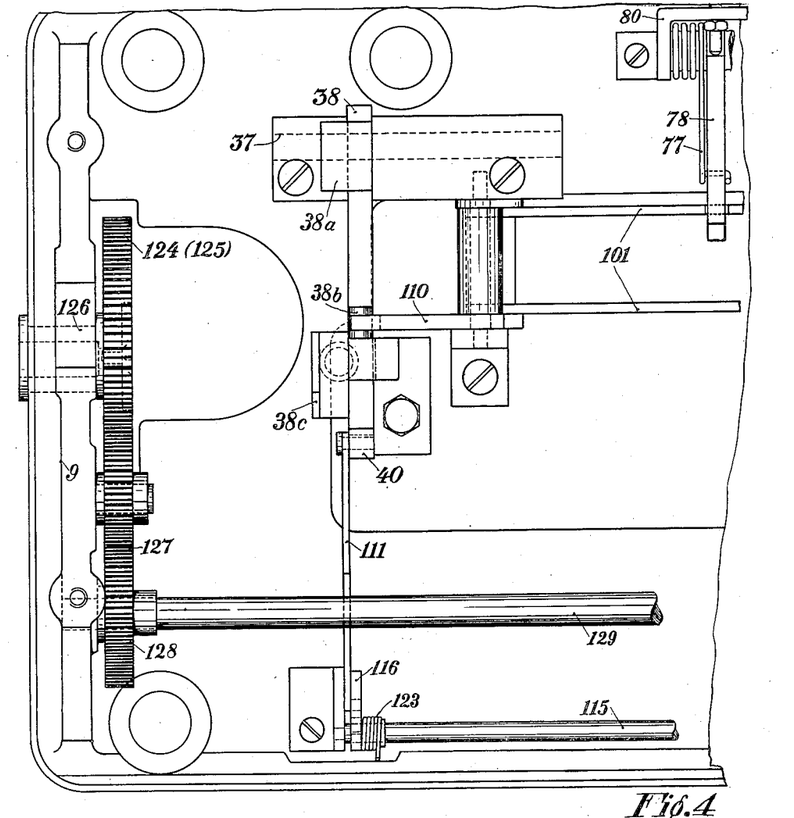
Figure 4 is a plan of the lowermost part of the machine frame.
Figures 4A, 15:
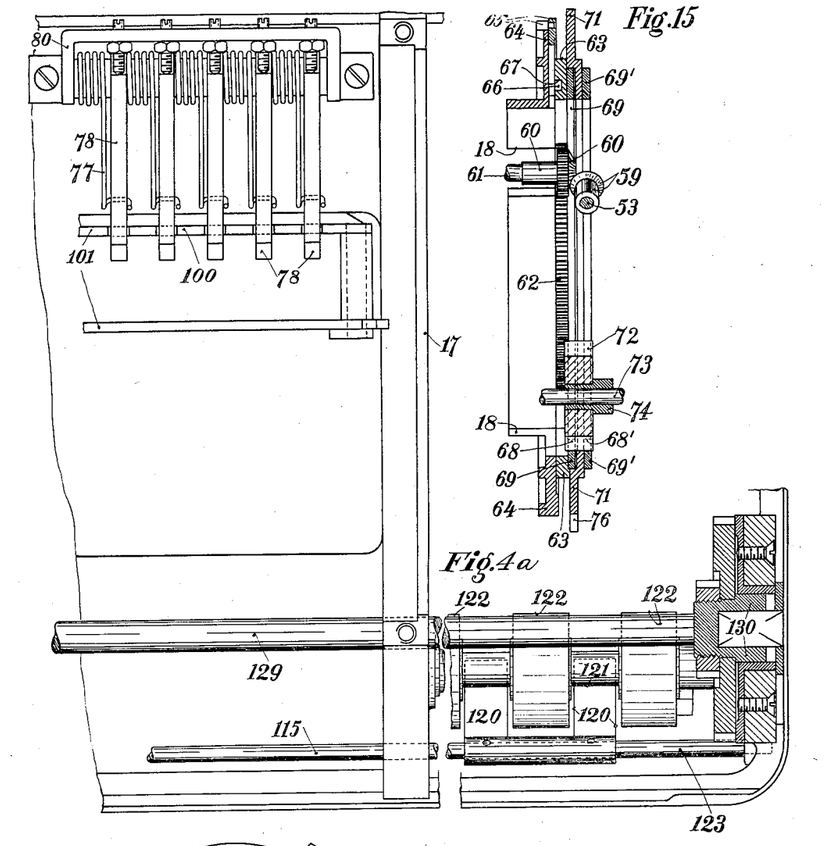
Figure 4a is a continuation of Figure 4 at the right.
Figure 15 is a diametrical section through a set of adjusting collars or rings.

When the bell crank lever 116 is moved from the position shown in Figure 5 to the position shown in Figure 6, the pin 117 raises the hook 111 above the nose 113, but the lever 116 does not at first pull the hook 111 to the left. The spindle 115 has at its front near to the larger part of the printing cylinder, an obliquely downwardly directed bifurcated feeler 120 (see Figure 5) which, when the machine is locked, projects downwards over three guide rollers 122 arranged at a distance apart side by side on a common spindle (Figure 15) 121. A spring 123 acting on the lever 116 always keeps the feeler 120 in this position. When the feeler 120 is operated by a letter introduced into the machine, the spindle 115 with the lever 116 will be rotated in an anti-clockwise direction (Figure 5) in opposition to the action of the spring 123.

This rotation of the spindle 115 may be produced also by hand, for instance by depressing a lever key mounted on the spindle 115 but not shown, when this is found necessary for instance for stamping or franking a letter of an unusually large size. The movement of the lever 116 then pulls the hook 111 by means of its nose 113 to the left, and with it the locking member 40, the said member 40 being provided with two projections or noses 40' and 40'' arranged above each other.

The locking lever 38 is held in its working position by the projection 40'. If for some reason the slide 101 were prevented from moving to the left (Figures 1 and 2) for instance, because one of the rings 15 has not been set so that the corresponding pawl 78 cannot enter one of the notches 76, and consequently the slide 101 strikes the pawl in question, the lever 38 cannot be turned by the lever 110 upwards over the projection 40'' because of its connection to the slide 101. The locking lever 38 is then held by this projection 40''. In such a case the machine cannot be released.

The cause of the trouble must be eliminated by a correct setting and not until then can the machine be released.

For driving the printing cylinder by hand on the left hand side of the machine, the ring 29 is provided with a gear wheel 12 which meshes with a gear wheel 125 which has a hollow hub 126 for the introduction of a crank handle from the outside. In order to be able to drive the machine by hand on the right hand side by means of the crank handle, a spindle 129 extending throughout the whole length of the machine and carrying at the right hand end thereof a sleeve 130 for the introduction of the crank handle, is connected to the toothed wheel 124 by a toothed gearing 127, 128 (see Figure 4).

The operation and the working of the value stamping machine described is briefly as follows:

The stamps 81 intended to imprint a given value are first brought to a position opposite the opening 84 in the printing plate 82 by turning the setting rings 70, 71. On a letter being introduced into the machine, the feeler 120 will be moved upwards, the spindle 115 rotated, and its lever 116 and the hook 111 will withdraw the locking member 40. The released locking lever 38 will then release the coupling lever 22 which will throw-in the coupling device and enable the printing cylinder to be driven either by means of the motor or of the crank handle.

Simultaneously with the turning of the lever 38, the lever 110 coupled to it will move the slide 101 with the locking rack 100 by which the pawls 78 and the setting rings 70, 71 will be locked, the pin 104 withdrawn from the recess 106, and the rod 73 with the coupling wheels 72 moved out of the position shown in Figure 1 to that shown in Figure 2 thereby uncoupling the setting rings 70, 71 from the rings 69.

At the beginning of rotation of the printing cylinder, the lever 97 controlled by the groove 85 will bring its teeth 99 in engagement with the gear wheels 57a–e and in this way the stamping wheels or their stamps to be used for printing will be set exactly opposite to the printing plate opening 84. These stamps will then be pushed by the lever 87 and the lever 90 into the opening 84 and held fast therein, owing to the action of the groove 85. After the printing on the article introduced such as a letter, post card etc. has been effected, and shortly before the printing cylinder reaches its starting position, the lever 90 will be withdrawn from the stamps which have done the printing and the gear wheels 57a–e are released from the ratchet teeth 99. At the same time the locking lever 38 will be operated by the coupling lever 22, and the latter disengaged by the locking lever 38. As soon as the printing cylinder reaches its starting or locked position, the pin 104 will engage with the notch 106 and together with the locking lever 38 lock the printing cylinder. A new setting of the stamping wheels can then be made or, if this is not necessary for the next printing operation, the printing cylinder can be released again in the manner already described and turned again through one revolution.

What I claim is:

1. In a stamping machine of the type hereinbefore described a hollow printing cylinder, a plurality of stamping wheels adjustable relatively to each other and mounted on a common spindle arranged within said cylinder and transversely to the longitudinal axis thereof, gear wheels affixed to said stamping wheels meshing with a corresponding toothed racked of a set of racks adapted to travel longitudinally parallel with the axis of said cylinder and a second set of gear wheels staggered relatively to each other in the longitudinal direction of the cylinder axis each meshing with a second set of teeth on its corresponding toothed rack and means for coupling said second set of gears to pin setting devices rotatable on said cylinder surface for setting pin wheels rotatable with said cylinder.

2. In a stamping machine of the type hereinbefore described a hollow printing cylinder, a plurality of stamping wheels adjustable relatively to each other and mounted on a common spindle arranged within said cylinder and transversely to the longitudinal axis thereof, gear mechanism associated with each of said stamping wheels, pin setting wheels having inner teeth, and rotatable on said cylinder, pin wheels rotatable with said cylinder and set by said pin setting wheels associated individually with one of said stamping wheels, and bevelled gear wheels gearing said pin setting rings to the gearing mechanism for setting the stamping wheels.

3. In a stamping machine of the type hereinbefore described, a hollow printing cylinder, a plurality of stamping wheels adjustable relatively to each other and mounted on a common spindle arranged within said cylinder and transversely to the longitudinal axis thereof, pin wheels rotatable with said cylinder, pin setting wheels rotatable on said cylinder, and gearing mechanism for associating said pin setting wheels with said stamping wheels, hand operated rings rotatable on said cylinder, coupling wheels for coupling said pin setting wheels to said hand operated rings, said coupling wheels being mounted on a common spindle movable longitudinally, an arm secured to said common coupling wheel spindle, a locking rack for locking said annular rings and attached to said arm, and a release device for the drive of the printing cylinder, connected so as to operate said locking rack.

4. In a stamping machine of the type hereinbefore described, a hollow printing cylinder, a plurality of stamping wheels adjustable relatively to each other and mounted on a common spindle arranged within said cylinder and transversely to the longitudinal axis thereof, pin setting wheels rotatable on said cylinder and gearing mechanism for associating said pin setting wheels with said stamping wheels, hand operated annular rings for setting said stamping wheels, coupling wheels mounted on a common spindle movable longitudinally for coupling said pin setting wheels to said hand operated annular rings, and a locking rack for locking said annular rings, an arm attached to said common coupling wheel spindle and to said locking rack, a second locking rack for locking said coupling wheels and means for holding said coupling wheels out of engagement with said second locking rack during rotation of the printing cylinder, said means comprising a pin mounted on said arm secured to the coupling wheel common spindle and engaging the surface of a stationary annular member provided with a recess with which said pin engages in the corresponding position of the locked cylinder.

5. In a stamping machine of the type hereinbefore described, a hollow printing cylinder, a plurality of stamping wheels adjustable relatively to each other and mounted on a common spindle arranged within said cylinder and transversely to the longitudinal axis thereof, means for setting said stamping wheels, and means for fixing the setting thereof before said stamping wheels are brought into the printing surface of the cylinder, said means comprising a circumferential cam groove in an annular stationary member and two pins guided in said cam groove so situated with respect to each other that one operates the fixing means prior to the other operating the means for bringing said stamping wheels into the printing surface of the cylinder.

6. In a stamping machine of the type hereinbefore described, a hollow printing cylinder, a plurality of stamping wheels comprising radially adjustable type carriers pulled towards the axis of said wheels by springs and provided with slots therein, said wheels being adjustable relatively to each other and mounted on a common spindle arranged within said cylinder and transversely to the longitudinal axis thereof, means for setting said stamping wheels and means for fixing the setting thereof prior to said type carriers so set being lifted into the surface of the printing cylinder, said second mentioned means comprising a circumferential cam groove on an annular stationary member, a pivoted lever provided with a pin guided in said cam groove, a second pivoted lever provided with a pin guided in said cam groove, said pins being so positioned with respect to each other that the first mentioned lever is operated prior to the second, projections on the end of the first mentioned lever for engaging with gear wheels provided on the stamping wheels for the locking thereof, and an arm on the second-mentioned lever for engaging, when operated, the recesses in said type carriers for the lifting thereof into the printing surface of the cylinder, and holding said type carriers in said printing surface.

WALTER OCHSENBEIN.